United States Patent [19]

Gupta et al.

[11] Patent Number: 4,691,760

[45] Date of Patent: Sep. 8, 1987

[54] COOLING AND VISOR DEFOGGING SYSTEM FOR AN AIRCRAFT PILOT AND CREW

[75] Inventors: Alankar Gupta; Adam J. P. Lloyd, both of Seattle, Wash.

[73] Assignee: The Boeing Company, Seattle, Wash.

[21] Appl. No.: 764,436

[22] Filed: Aug. 9, 1985

[51] Int. Cl.⁴ .................... F25B 29/00; B60H 1/00; B61D 27/00; G05D 23/00
[52] U.S. Cl. ........................ 165/26; 165/40; 165/46; 236/13; 236/49; 62/259.3
[58] Field of Search .................. 165/26, 40, 46; 62/259.3; 236/13, 49, 21 R, 93 B

[56] References Cited

U.S. PATENT DOCUMENTS

| | | | |
|---|---|---|---|
| 2,557,099 | 6/1951 | Green | 62/136 |
| 2,693,088 | 11/1954 | Green | 62/6 |
| 2,819,590 | 1/1958 | Green | 165/46 |
| 2,923,222 | 2/1960 | Manning et al. | 236/13 |
| 2,977,051 | 3/1961 | Farkas et al. | 236/13 |
| 2,984,994 | 5/1961 | Hankins | 62/457 |
| 3,000,616 | 9/1961 | Spangler | 257/12 |
| 3,122,318 | 2/1964 | Null | 236/13 |
| 3,126,947 | 3/1964 | Jensen | 236/13 |
| 3,474,790 | 10/1969 | Benzinger | 128/402 |
| 3,487,765 | 1/1970 | Lang | 98/1 |
| 3,500,827 | 3/1970 | Paine | 128/142.5 |
| 3,648,765 | 3/1972 | Starr | 165/39 |
| 3,736,764 | 6/1973 | Chambers et al. | 62/89 |
| 3,744,555 | 7/1973 | Fletcher et al. | 165/46 |
| 3,913,833 | 10/1975 | Minett et al. | 236/49 |
| 3,938,741 | 2/1976 | Allison | 236/93 B |
| 4,024,730 | 5/1977 | Bell et al. | 62/259 |
| 4,146,933 | 4/1979 | Jenkins et al. | 2/2 |
| 4,271,833 | 6/1981 | Moretti | 128/201.29 |

Primary Examiner—William R. Cline
Assistant Examiner—John K. Ford
Attorney, Agent, or Firm—Bruce A. Kaser

[57] ABSTRACT

An improved thermal control system for flight apparel worn in an aircraft. An environmental control system (11) produces both a flow of cold air in a duct (12) and a flow of warm air in another duct (14). A mixing chamber (16) is connected to both ducts (12, 14) and mixes the flows of cold and warm air received therefrom to produce a flow of personal conditioning air. A valve (32), positioned in the warm air duct (14), controls the amount of warm air flowing into the chamber (16). The valve (32) is operated to adjust the mixing of warm air with cold air in the chamber (16), to thereby adjust the temperature of the personal conditioning air so that it is at a temperature which is comfortable. A comfortable temperature is selected by a control switch (28). The valve (32) is continuously adjusted in accordance with temperature signals received from a temperature sensor (30). A controller minimizes the error between the temperature served by the sensor (30) and the temperature selected by the control switch (28). The personal conditioning air is delivered to flight apparel by means of a personal air conditioning conduit (20).

11 Claims, 4 Drawing Figures

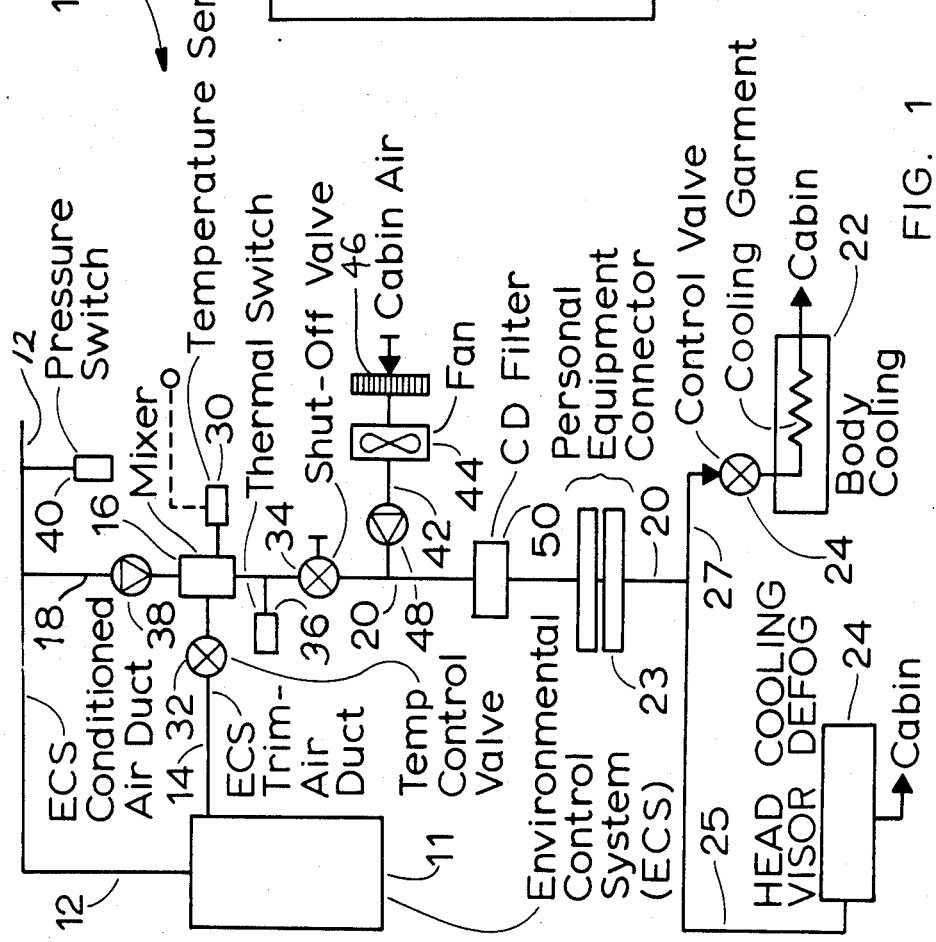

COOLING AND VISOR DEFOGGING SYSTEM FOR AN AIRCRAFT PILOT AND CREW

The Federal Government has rights in this invention pursuant to Contract No. F33615-83-C-0651 awarded by the U.S. Airforce.

TECHNICAL FIELD

This invention relates to a personal thermal control and visor defogging system for aircraft pilots and crew.

BACKGROUND ART

Keeping a pilot or crew member at a comfortable temperature while in an aircraft cockpit is a well-known problem. Various thermal control systems have been developed addressing this problem. Of all such systems, the most typical is one that employs a closed loop liquid system for removing body heat combined with an open loop ambient air system that provides flight helmet or hood ventilation. Typically, the closed loop liquid system employs a dedicated freon vapor refrigeration unit and the open loop ambient air helmet ventilation system employs a dedicated blower.

A thermal control system which utilizes a dedicated freon vapor refrigeration unit has many significant drawbacks. The refrigeration unit has to be housed someplace aboard the aircraft. A pilot or crew member must, upon entering the aircraft cockpit, connect his body garment to the system. This requires at least two interfaces between the refrigeration unit and any one pilot or crew member; one interface being required for a liquid supply line to carry cooling fluid to the garment, and the other for removing warmed cooling fluid from the garment. Further, when the system also utilizes an ambient open loop air system for helmet ventilation and/or protection against chemical agents, an additional air supply line, filter and blower, and an associated interface is required for providing ambient air to the flight helmet.

A problem with each of the liquid line interfaces is that they require leak-proof quick connect/disconnect connectors between the garment and the refrigeration unit. This is important so that a pilot or crew member can easily enter or leave the cockpit without contaminating the cockpit with heat transfer fluid. Another problem is that a significant amount of maintenance is involved in making sure this type of system always has an adequate supply of heat transfer liquid and refrigerant, and in making sure that the refrigeration unit, which is a relatively complicated piece of machinery, is operating properly. Maintenance of this system may require special procedures, equipment and training, with regard to both the refrigeration unit and the garment itself.

Still another problem associated with the above system is that it imposes significant weight penalties on the particular aircraft in which it is used. The liquid in the system, the refrigeration unit, and the tubing required for transferring fluid between the garment and the refrigeration unit all add significant weight to the aircraft.

Still another drawback is that providing ambient air (filtered) to a flight helmet does not necessarily provide head cooling. Further, this type of system has been known to occupy significant volume in a cockpit and its use has resulted in significant cockpit noise.

The present invention has been developed for the purpose of solving the above-stated problems. Several U.S. patents are known to be pertinent to the patentability of the present invention. These patents are listed as follows: U.S. Pat. No. 2,557,099 issued to Green on June 19, 1951; U.S. Pat. No. 2,693,088 issued to Green on Nov. 2, 1954; U.S. Pat. No. 2,984,994 issued to Hankins on May 23, 1961; U.S. Pat. No. 3,000,616 issued to Spangler on Sept. 19, 1961; U.S. Pat. No. 3,474,790 issued to Benzinger on Oct. 28, 1969; U.S. Pat. No. 3,487,765 issued to Lang on Jan. 6, 1970; U.S. Pat. No. 3,500,827 issued to Paine on Mar. 17, 1970; U.S. Pat. No. 3,648,765 issued to Starr on Mar. 14, 1972; U.S. Pat. No. 3,736,764 issued to Chambers et al on June 5, 1973; U.S. Pat. No. 3,744,555 issued to Fletcher et al on July 10, 1973; U.S. Pat. No. 4,024,730 issued to Bell et al on May 24, 1977; U.S. Pat. No. 4,146,933 issued to Jenkins et al on Apr. 3, 1979; and U.S. Pat. No. 4,271,833 issued to Moretti on June 9, 1981.

DISCLOSURE OF THE INVENTION

The present invention is designed for use in connection with an aircraft having an environmental control system (ECS) onboard the aircraft. The environmental control system has the capability of producing both a flow of conditioned cold air in one duct and a flow of conditioned warm air in another duct. The invention provides a supply of personal conditioning air to flight apparel (including vest and helmet) worn by a pilot or crew member by mixing the flows of warm and cold air to produce personal conditioning air at a comfortable temperature.

The invention includes a mixing chamber which is connected to both the cold and warm air ducts. The mixing chamber receives flows of cold and warm air therefrom and mixes the respective flows. Positioned in the warm air duct is a valve means which controls the amount of warm airflow into the mixing chamber. A personal air conditioning conduit connects the mixing chamber with the flight apparel worn by the pilot or crew, and communicates the personal conditioning air from the chamber to the apparel.

Also included is a means for controlling the valve means, to operate the valve means to adjust the amount of warm air flowing into the mixing chamber. Such control means includes temperature sensing means for sensing the temperature of the personal conditioning air once it has been produced. Adjustment of the valve means is made in response to an error temperature signal generated by a controller which continuously monitors the temperature of air produced by the mixing chamber and compares it with the desired air temperature. In this manner, such adjustment varies the mixing of cold and warm air in the chamber so that personal conditioning air is supplied to the flight apparel at a preselected comfortable temperature.

The system includes a thermal switch which is positioned in the personal air conditioning conduit downstream of the mixing chamber. A shut-off valve means is also positioned in the personal conditioning conduit, but downstream of the thermal switch. The thermal switch monitors or senses the temperature of the personal conditioning air and operates the shut-off valve means to block the flow of personal conditioning air from the chamber to the flight apparel when the switch senses a temperature of personal conditioning air that is above a preselected maximum temperature. Therefore, if personal conditioning air is supplied at a temperature that is too hot, the thermal switch shuts the system down.

Included in the system is a means for sensing the pressure of the conditioned cold air, supplied by the ECS, and a means for supplying aircraft cabin or cockpit air to the flight apparel. Such cabin air supply means is responsive to the cold air pressure sensing means so that cabin air is supplied to the apparel when the pressure of the ECS cold air drops below a certain preselected pressure value. The cabin air supply means is connected to the personal air conditioning conduit so that cabin air is delivered directly into such conduit, at a position that is downstream of the shut-off valve means. The cabin air supply means may include a cabin air duct, connected to the personal air conditioning duct, and a fan located in the cabin air duct and operable to drive cabin air therethrough into the personal air conditioning duct. An air filter may also be positioned in the cabin air duct upstream of the fan, for the purpose of removing dirt and particulate matter from the cabin-air utilized by the system.

The cabin air supply means may further include an air chiller means for cooling the cabin air to a preselected temperature before it is delivered into the personal air conditioning conduit. Such air chiller means may be in the front of a common air chiller (of the freon vapor or thermo-electric type) which is positioned in the cabin air supply duct downstream of the fan.

A means for recirculating personal conditioning air from the flight apparel back to the cabin air supply means may also be provided in the system. Such recirculating means may include a recirculation duct connecting the flight apparel to the cabin air duct. This duct would be connected to the cabin air duct in a manner so that recirculated personal conditioning air is delivered into the cabin air duct at a position upstream of the fan. An exhaust duct, connected to the cabin air duct upstream of the fan, exhausts recirculated personal conditioning air during normal operation of the system, meaning that personal conditioning air is supplied from the mixing chamber to the flight apparel, and then is exhausted into the cabin. The exhaust duct includes a one-way check valve which permits air to flow only in a direction from the cabin air duct to the cabin. The cabin air duct may also include a one-way inlet valve positioned upstream of the exhaust duct to permit cabin air to flow only in a direction downstream of such valve.

Although the flight apparel may take many forms, preferably it is in the form of a body garment and a helmet having a visor. The personal air conditioning conduit delivers the produced personal conditioning air to both a first conduit connected to the helmet and a second conduit connected to the body garment. The second conduit includes a valve positioned therein for controlling the amount of personal conditioning air supplied to the body garment.

A chemical defense filter may be positioned in the personal air conditioning conduit downstream of the position where cabin air is delivered into such conduit. This provides protection to the wearer of the flight apparel when the system is utilized in an environment having certain harmful chemical agents.

The present system integrates aircraft environmental control, personal thermal control, and helmet ventilation/defogging all into one system. This provides several advantages. One advantage is that the system eliminates the use of any secondary heat transfer fluids (water or glycol, for example) and refrigerant (freon, for example), at least when an air chiller is not used along with the cabin air supply means. This eliminates any liquid supply line connections between the flight apparel and a personal equipment connector. The presence of heat transfer fluids in the aircraft cabin or cockpit is thereby eliminated. Even when an air chiller is used, any use of a secondary heat transfer fluid is still eliminated, and in any event, an air chiller would not require liquid interfaces between the apparel and the system.

By eliminating the use of heat transfer liquids for cooling flight apparel the present system also provides a resultant reduction in the encumbrance of the pilot or crew wearing the apparel. Helmet cooling is also simplified, at least in comparison to those systems wherein helmet cooling is provided by a liquid cooling cap which is integrated as a portion of the helmet.

The present system also provides many logistics advantages; reduces aircraft weight penalties and space requirements; provides better management of the air produced by the aircraft environmental control system; and enhances the chemical defense protection of the wearer of the flight apparel, at least when the flight apparel consists of a permeable or semi-permeable cooling garment.

These advantages, and further advantages, will become apparent to the reader upon reading subsequent portions of this application.

BRIEF DESCRIPTION OF THE DRAWINGS

In the drawings like reference numerals and letters refer to like parts throughout the various views, and wherein:

FIG. 1 is a schematic view of a thermal control system for providing personal air conditioning to flight apparel, in accordance with one embodiment of the present invention;

FIG. 2 is a pictorial frontal view of a control panel in an aircraft cockpit or cabin, and shows the controls for the system shown in FIG. 1;

BEST MODE FOR CARRYING OUT THE INVENTION

Figure 3:
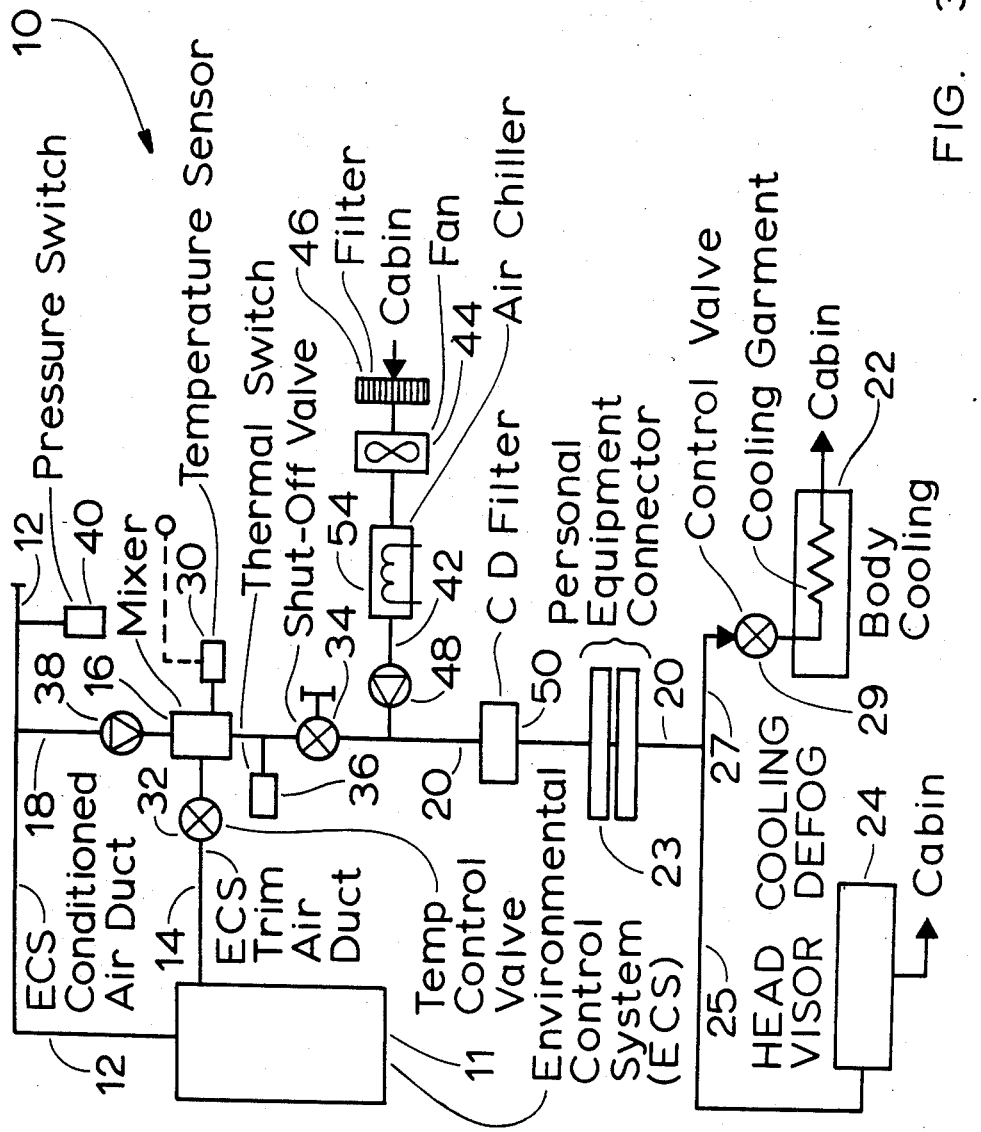
FIG. 3 is a schematic view of a system much like that shown in FIG. 1, but shows a different embodiment.
Figure 4:
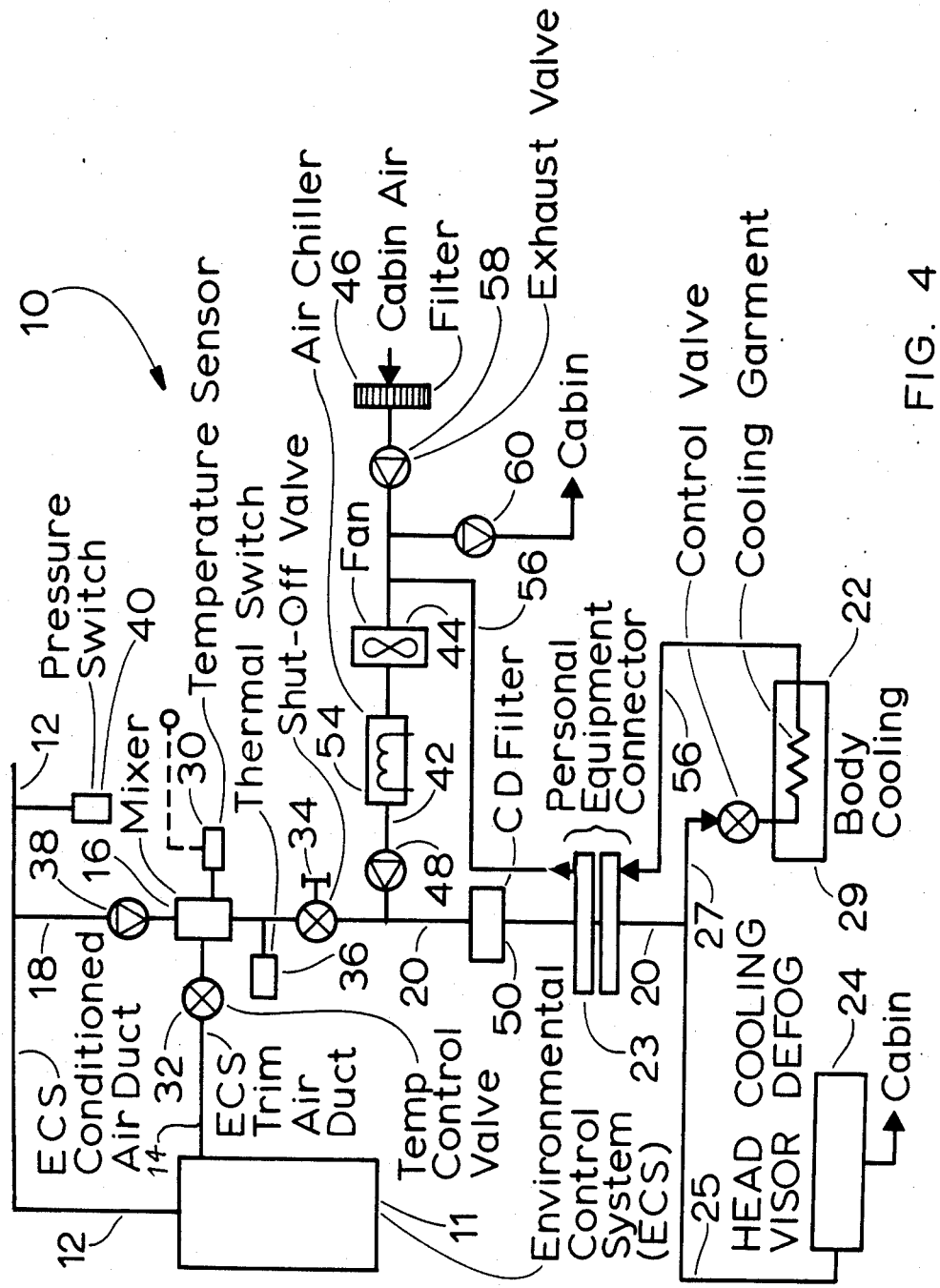
FIG. 4 is a schematic view of a system much like that shown in FIGS. 1 and 3, but shows still another embodiment.

Referring now to the drawings, and first to FIG. 1, therein is shown a thermal control system 10 constructed in accordance with a preferred embodiment of the invention. The system 10 is designed for use in conjunction with a preexisting environmental control system 11 located on board an aircraft. Such a control system would, of course, be well-known to a person skilled in the art.

The environmental control system 11 outputs a flow of cold conditioned air through one duct 12, and a flow of warm conditioned air through another duct 14. A mixing chamber 16 is connected to the cold air duct 12 by a duct 18. The mixing chamber 16 is also connected to the warm air duct 14.

Cold and warm is communicated from the ducts 12, 14 into the chamber 16 where it is mixed to produce a flow of personal conditioning air. The temperature of the conditioning air is in the range of temperatures of both the cold and warm air. The personal conditioning air is then communicated through a personal conditioning air duct or conduit 20 from the mixing chamber 16 to a body garment, indicated schematically at 22, and a flight helmet, indicated schematically at 24. The personal conditioning air conduit 20 is connected to the body garment 22 and the flight helmet 24 by a personal equipment connector, indicated generally by arrow 23. The duct 20 is branched into first and second conduits or ducts 25, 27, which deliver conditioning air to the flight helmet and body garment 24, 22, respectively. The amount of conditioning air which flows into the body garment may be controlled by a valve 29 which is manually operable.

A control panel 26 in the aircraft cockpit permits a pilot or crew member to select the temperature of the personal conditioning air to the garment and helmet 22, 24. The pilot or crew member merely rotates a control switch 28 on the panel 26 to set the temperature of the personal conditioning air. Turning the control switch 28 sets a reference (or required) temperature. A temperature sensor 30 may be connected to the chamber 16, or another appropriate location, for sensing the temperature of the personal conditioning air produced therein. This sensor 30 continuously provides a signal to an electronic controller (not shown).

The controller, which may be an analog or digital device, compares the feedback signal from the temperature sensor 30 with the reference signal from the control switch 28, and generates an error signal. The error signal is processed and a signal to modulate the temperature control valve 32 is produced so that the error signal is minimized. Those experienced in the art would recognize that this provides feedback control for good control stability.

A shut-off valve 34 and a thermal switch 36 are positioned in the personal air conditioning conduit 20 downstream of the mixing chamber 16. The thermal switch 36 constantly monitors the temperature of the personal conditioning air. If the temperature of such air exceeds a maximum preselected value, then the terminal switch operates the shut-off valve 34, to block the flow of conditioning air from the mixing chamber 16 to the body garment and flight helmet 22, 24. A one-way check valve 38 is positioned in duct 18 between the cold air duct 12 and the mixing chamber 16 to prevent any possible back flow from the warm air duct 14 into the cold air duct 12.

A pressure switch 40 is connected to the cold air duct 12 for sensing the pressure of conditioned cold air therein. If the pressure switch indicates that the cold air pressure is below a certain minimum threshold value, then the system 10 operates to supply ambient cabin air to the personal conditioning air conduit 20. A cabin air duct 42 is connected to the conduit 20 downstream of the shut-off valve 34 for this purpose.

In the conduit 42 there is positioned a fan 44, electrically connected to the pressure switch 40 (such electrical connection not being shown in the drawings). The fan 44 is activated when the pressure of the cold conditioned air in duct 12 drops below the minimum threshold value. The fan then drives cabin air through duct 42 into the personal air conditioning conduit 20. There, the cabin air is communicated onward to the body garment and flight helmet 22, 24. A filter 46 is provided in the cabin air duct 42 upstream of the fan 44. The filter 46 removes dirt and particulate matter from the cabin air before it is communicated into the system 10. A one-way check valve 48 is also provided in the cabin air conduit 42 downstream of both the fan and filter 44, 46. This valve 48 prevents the normally provided flow of personal conditioning air from being communicated from the conduit 20 out into the aircraft cabin or cockpit.

In preferred form, a chemical defense filter 50 is positioned in the personal conditioning air conduit 20 between the position where cabin air is supplied into such conduit and the personal equipment connector 23. When the system 10 is used in environments where certain chemical agents are also present, the chemical defense filter 50 prevents any of such chemical agents from being communicated to either the garment 22 or the flight helmet 24.

The control panel 26 includes a status light 52 connected to the thermal switch 36 for indicating an over temperature condition. The status light 52 also serves as a system reset after a particular system malfunction has been corrected. When the selector switch 28 is in the "off" position labeled on the control panel 26 of FIG. 2, no part of the system 10, including the cabin air supply means or fan 44, is operable.

FIG. 3 shows an alternative embodiment of the system 10. In this embodiment, an air chiller 54 is also positioned in the cabin air conduit 42 in between the fan 44 and the one-way check valve 48. The air chiller 54 may operate when the fan 44 is operative in response to either a malfunction of the temperature control valve 32, or because of low pressure in the conditioned air duct 12. The air chiller 54 may be in the form of a simple chiller, for cooling cabin or cockpit air to a fixed temperature, or it could be a sophisticated chiller providing chilled air in response to the position of the selector switch 28 on the control panel 26. The air chiller 54 could be in the form of either a freon vapor or thermoelectric chiller, for example, both of which would be familiar to a person skilled in the art. It would be possible for the status switch light 52 on the panel to also indicate malfunctions or failures of the air chiller 54 in the same manner that it indicates malfunctions or failures in other portions of the system 10.

The body garment 22 may be of a type which is either semi-permeable or non-permeable. In another embodiment of the invention, personal conditioning air from the cooling garment 22 may be recirculated through a recirculation duct, indicated generally by 56. The recirculation duct 56 connects the garment 22 to the cabin air duct 42. Recirculated personal conditioning air is delivered to the cabin air duct upstream of the fan 44. Therefore, when the fan 44 is in operation, air from the garment 22 may be recirculated through the duct 42, making the cooling process of cabin air supplied to the garment more efficient. This latter embodiment assumes, of course, that an air chiller 54 is present in the cabin air duct 42. During operation of the fan 44, any air lost to the cabin by means of the flight helmet 22 is replaced by more cabin air induced through a one-way inlet valve 58. When the fan 44 is inoperable, meaning that personl air conditioning air is supplied from the mixing chamber 16 through the conduit 20, any recirculated air being delivered from conduit 56 is exhausted into the cabin or cockpit through a one-way exhaust valve 60.

The above description has been provided for exemplary purposes only. This description is not to be construed in a limiting sense. It is to be appreciated that only the best mode for carrying out the invention has been described above, along with alternative embodiments, but other embodiments of the invention may also exist. The spirit and scope of the invention is to be limited only by the appended claims which follow.

What is claimed is:

1. In an aircraft having an environmental control system that produces both a flow of conditioned cold air in one duct and a flow of conditioned warm air in another duct, a thermal control system providing air conditioning to thermal control apparel worn by an aircraft pilot or crew, the system comprising:

a mixing chamber connected to both said cold and warm air ducts in a manner so as to receive flows of cold and warm air therefrom;

valve means, positioned in said warm air duct, for controlling the amount of warm air flow into said chamber, and wherein said flows of cold and warm air are mixed in said chamber to produce personal conditioning air;

a personal air conditioning conduit connecting said chamber and said flight apparel, for communicating said personal conditioning air from said chamber to said apparel;

means for controlling said valve means, including means for sensing the temperature of said personal conditioning air, wherein said control means operate said valve means to adjust the amount of warm air flowing into said mixing chamber in response to signals generated by said temperature sensing means, such signals indicating the temperature of said personal conditioning air, with such adjustment varying the mixing of cold and warm air in said chamber so that personal conditioning air is communicated to said flight apparel at a preselected comfortable temperature;

a thermal switch, positioned in said personal air conditioning conduit, said switch also sensing the temperature of said personal conditioning air;

shut-off valve means, positioned in said conduit downstream of said thermal switch, for blocking communication of said personal conditioning air from said mixing chamber to said apparel, said shut-off valve means being operated by said thermal switch to block said flow when said switch senses conditioning air temperature that is above a preselected maximum temperature;

means for sensing the pressure of said conditioned cold air; and means for supplying aircraft cabin air to said flight apparel, said cabin air supply means being responsive to said pressure sensing means in a manner so that cabin air is supplied to said apparel when the pressure of said cold air drops below a certain preselected pressure value, said cabin air supply means being connected to said personal air conditioning conduit in a manner so that cabin air is delivered into said conduit at a position downstream of said shut-off valve means.

2. The system in accordance with claim 1, wherein said cabin air supply means includes a cabin air duct, connected to said personal air conditioning conduit, and a fan positioned in said cabin air duct and operable to drive cabin air through said cabin air duct into said personal air conditioning conduit, and further, an air filter positioned in said cabin air duct upstream of said fan.

3. The system in accordance with claim 1, including a chemical defense filter positioned in said personal air conditioning conduit downstream of the position where said cabin air is delivered into said conduit.

4. The system in accordance with claim 1, wherein said flight apparel includes a body garment and a helmet with a visor, and wherein said personal air conditioning conduit delivers personal conditioning air to a first conduit connected to said helmet for supplying personal conditioning air thereto, and wherein said personal air conditioning conduit delivers personal conditioning air to a second conduit connected to said body garment for supplying personal conditioning air thereto, and including a valve positioned in said second conduit for controlling the amount of personal conditioning air supplied to said body garment.

5. The system in accordance with claim 1, wherein said cabin air supply means includes air chiller means for cooling cabin air to a preselected temperature before such air is delivered into said personal air conditioning conduit.

6. The system in accordance with claim 1, including means for recirculating personal conditioning air from said flight apparel back to said cabin supply means.

7. The system in accordance with claim 2, including an air chiller positioned in said cabin air supply duct downstream of said fan, for cooling cabin air to a preselected temperature before it is delivered into said personal air conditioning conduit.

8. The system in accordance with claim 7, including means for recirculating personal conditioning air from said flight apparel back to said cabin air supply means.

9. The system in accordance with claim 8, wherein said recirculating means includes a recirculation duct connecting said flight apparel to said cabin air duct, wherein said recirculation duct is connected to said cabin air duct in a manner so that recirculated personal conditioning air is delivered into said cabin air duct at a position upstream of said fan.

10. The system in accordance with claim 9, including an exhaust duct connected to said cabin air duct at a position upstream of the position where said recirculation duct delivers recirculated personal conditioning air to said cabin air duct, said exhaust duct having a port for exhausting recirculated air to an aircraft cabin, and a one-way check valve positioned in said exhaust duct for permitting air to flow only in a direction from said cabin air duct to said cabin.

11. The system in accordance with claim 10, including a one-way inlet valve positioned in said cabin air duct upstream of the position where said exhaust duct is connected to said cabin air duct, said inlet valve being operable to permit cabin air to flow only in a direction downstream therefrom.

* * * * *

UNITED STATES PATENT AND TRADEMARK OFFICE
CERTIFICATE OF CORRECTION

PATENT NO. : 4,691,760

DATED : September 8, 1987

INVENTOR(S) : Alankar Gupta et al.

It is certified that error appears in the above-identified patent and that said Letters Patent are hereby corrected as shown below:

Column 3, line 24, "front" should be -- form --.

Column 4, line 62, after "Cold and warm", insert -- air --.

Claim 6, column 8, line 28, after "cabin", insert -- air --.

Signed and Sealed this

Fifth Day of April, 1988

Attest:

DONALD J. QUIGG

Attesting Officer

Commissioner of Patents and Trademarks